United States Patent [19]
Phillips

[11] Patent Number: 5,873,550
[45] Date of Patent: Feb. 23, 1999

[54] SUPPORT DEVICE

[75] Inventor: Raymond John Phillips, Alton, United Kingdom

[73] Assignee: RJP Positioning Clip Limited, Alton, England

[21] Appl. No.: 735,242

[22] Filed: Oct. 22, 1996

[51] Int. Cl.[6] .................................................. F16L 3/00
[52] U.S. Cl. .......................................... 248/73; 248/74.1
[58] Field of Search ................... 248/71, 72, 73, 248/74.1, 74.2, 74.3, 65

[56] References Cited

U.S. PATENT DOCUMENTS

| | | | |
|---|---|---|---|
| 3,463,428 | 8/1969 | Kindorf et al. | 248/72 |
| 4,564,163 | 1/1986 | Barnett | 248/74.3 |
| 5,622,341 | 4/1997 | Stana | 248/73 |

FOREIGN PATENT DOCUMENTS

| | | | |
|---|---|---|---|
| 0244673 | 11/1987 | European Pat. Off. | F16L 3/24 |
| 2517411 | 6/1983 | France | F16S 3/00 |
| 2589203 | 4/1987 | France | F16B 2/00 |
| WO94/01710 | 1/1994 | WIPO | F16L 3/13 |

*Primary Examiner*—Ramon O. Ramirez
*Assistant Examiner*—Willie Berry, Jr.
*Attorney, Agent, or Firm*—Jacobson, Price, Holman & Stern, PLLC

[57] ABSTRACT

A support device (1) is suitable for securing an elongate member (10) such as, a pipe or cable, to a length of channel-section track (14). The track is secured to a supporting structure (15), normally a ceiling or possibly a wall. The support device includes a clip (5) which provides a means (11a, 11b) for retaining the elongate member (10), and a track-engagement portion (3) connected to said clip (5). A flexible two-part foot (2a, 2b) forming the track-engagement portion (3) is inserted into the track (14) and by rotating the entire device (1) through 90° is cammingly engaged with the track (14). The flexibility of the foot (2a, 2b) allows the device (1) to fit a range of different track (14) sizes.

24 Claims, 4 Drawing Sheets

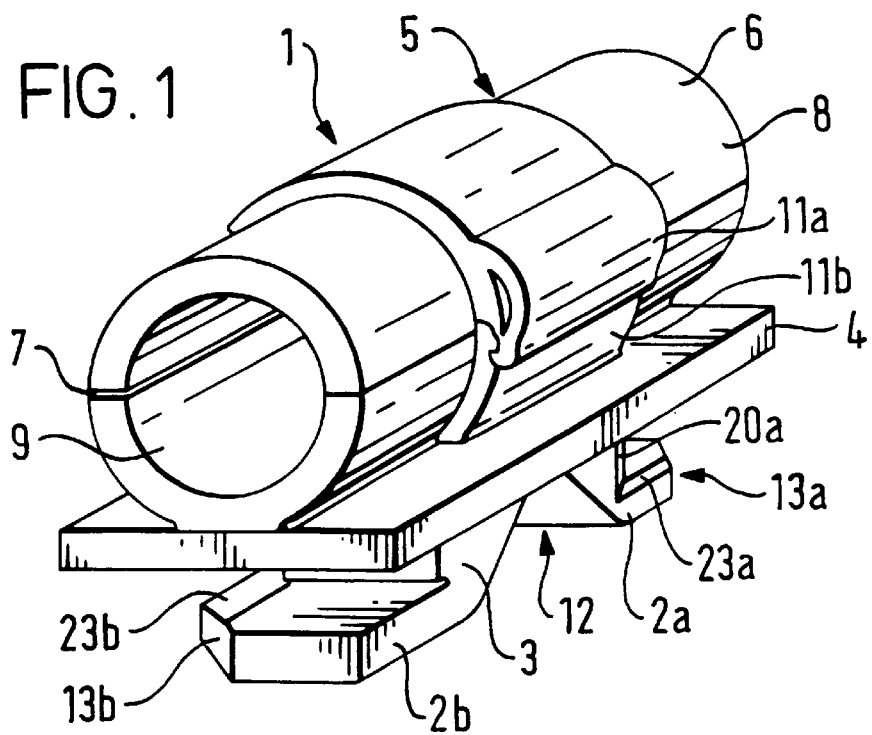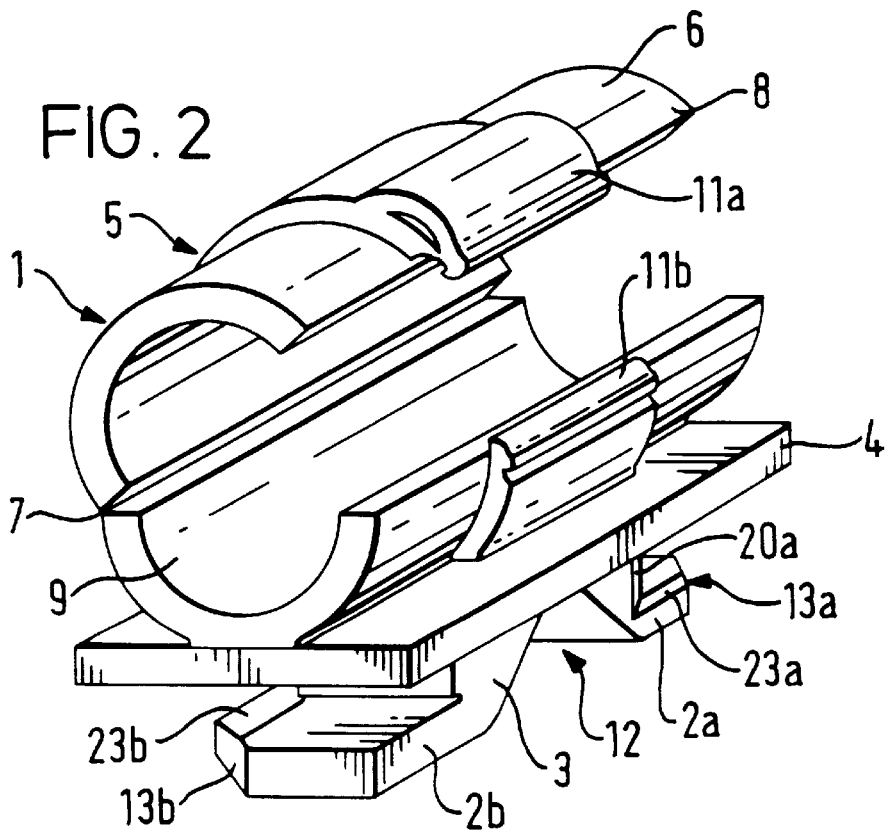

SUPPORT DEVICE

The present invention relates to a support device for an elongate member particularly, although not exclusively, air-conditioning pipework.

Conventionally, most air-conditioning pipework has needed to be lagged to increase its efficiency. This has resulted in a need for the provision of a certain clearance when fitting pipework to a ceiling or wall within a building. The provision of sufficient clearance has been achieved by securing to the supporting structure lengths of channel section or track on which are mounted support devices arranged to be clamped to the pipe. However, many prior art support devices disadvantageously comprise a number of components which must be manipulated and assembled in situ. This is particularly difficult close to a ceiling or wall as the components must be attached to an inverted channel whilst the installer is standing on a ladder with the pipe to be attached resting on his shoulder. Should a component be accidentally dropped then the installer must descend the ladder, whilst continuing to support the pipe, to retrieve the component before recommencing assembly. Also, the clamping action provided by such a prior art device effectively prevents any movement of the pipe due to expansion particularly when part of a variable volume refrigeration system, or deflection of the building. Furthermore, the support devices provided by such a prior art device are designed to only secure to lengths of channel section or track of one width.

It is an object of the present invention to provide an improved support device which overcomes the disadvantages of the prior art, reduces transmitted vibration, and accommodates deflection of the pipe relative to the device. It is a further object of this invention to provide an improved support device which fits different widths of track.

According to the present invention, there is provided a support device for use in securing an elongate member, such as a pipe or cable, to a length of channel-section track, such track being secured in use to a supporting structure, the support device comprising a clip which provides a means for retaining the elongate member, and a track-engagement portion connected to said clip which is insertable in said track and is rotatable to cammingly engage with said track, characterized in that said track-engagement portion comprises a shank-like portion which provides a two-part foot to permit engagement with tracks of various sizes.

Preferably, said shank-like portion is provided with a v- or u-shaped profile.

Again preferably, said shank-like portion and two-part foot are formed of a resilient plastics material which provides further flexibility.

Once again preferably, said foot is provided with at least one rounded corner to facilitate rotation to said second position.

Once more preferably, said retaining means is formed integrally with the clip.

Still preferably, said device includes mutually opposed surfaces between which first and second engagement surfaces of the track are cammingly engaged.

Once again preferably, at least one of said mutually opposed surfaces is provided with an inclined face to facilitate engagement with said first and second engagement surfaces of said track.

Once more, preferably, said device is of unitary construction.

In order to aid in understanding the invention a specific embodiment thereof will now be described by way of example and with reference to the accompanying drawings, in which:

FIG. 1 is a perspective view of a support device according to the invention shown with the clip in a closed position;

FIG. 2 is a perspective view of the device of FIG. 1 shown with the clip in an open position;

Figure 3:
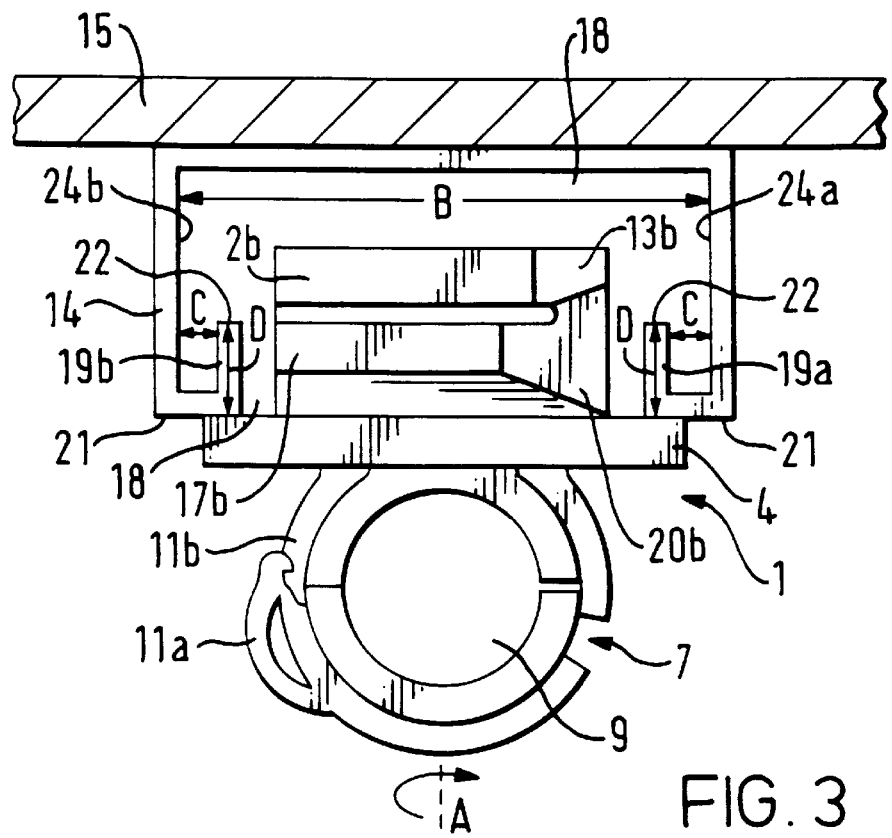
FIG. 3 is an end elevation view of the device of FIG. 1 shown at an initial stage of installation on a track, which is attached to a supporting structure.

The support device 1 shown in the Figures, is a unitary moulding of a plastics material, having suitable physical properties, such as, for example, neoprene.

Referring to FIG. 1, there is shown the support device 1 comprising a two-part foot 2a, 2b supporting a shank-like portion 3 which is connected to a pedestal 4 carrying a clip 5.

The clip 5 has a generally cylindrical hollow body 6 which is split longitudinally from one open end to the other. A living hinge 7 arranged parallel to the split allows a segment 8 of the body 6 to move thereby defining a slot 9 into which an elongate member 10 is insertable. Complementary inter-engaging formations 11a, 11b on the axially aligned marginal portions of the body allow the hinged segment 8 to be secured to the body 6.

The two-part foot 2a, 2b is provided with a pair of diagonally opposed corners 13a, 13b which are rounded to facilitate, in use, rotation of the device 1 for insertion into a length of channel-section track 14 secured to a supporting structure, such as a ceiling or similar surface, 15. The shank-like portion 3 is provided with a v- or u-shaped profile 12 to separate the two-parts of the two-part foot 2a, 2b providing flexibility for the two-parts of the two-part foot 2a, 2b to move towards each other.

Figure 4:
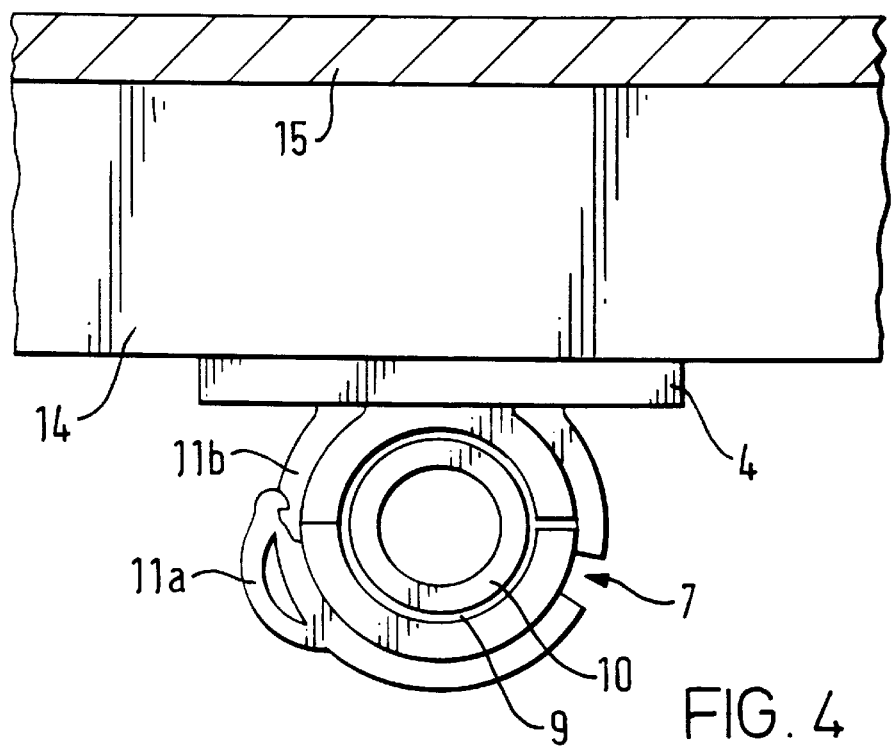
FIG. 4 is a end elevation view of the device of FIG. 1 shown installed on a track, which is attached to a supporting structure, with an elongate member inserted.
Figure 5:
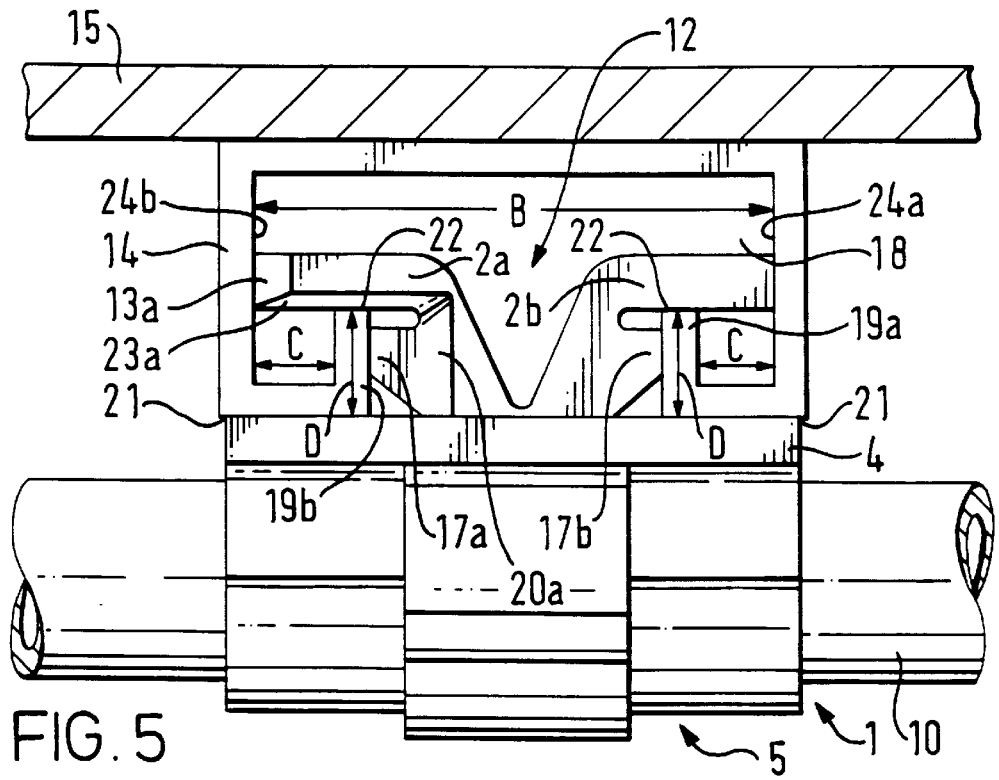
FIG. 5 is a side elevation view of the device of FIG. 1 shown installed on a track, with an elongate member inserted.
Figure 6:
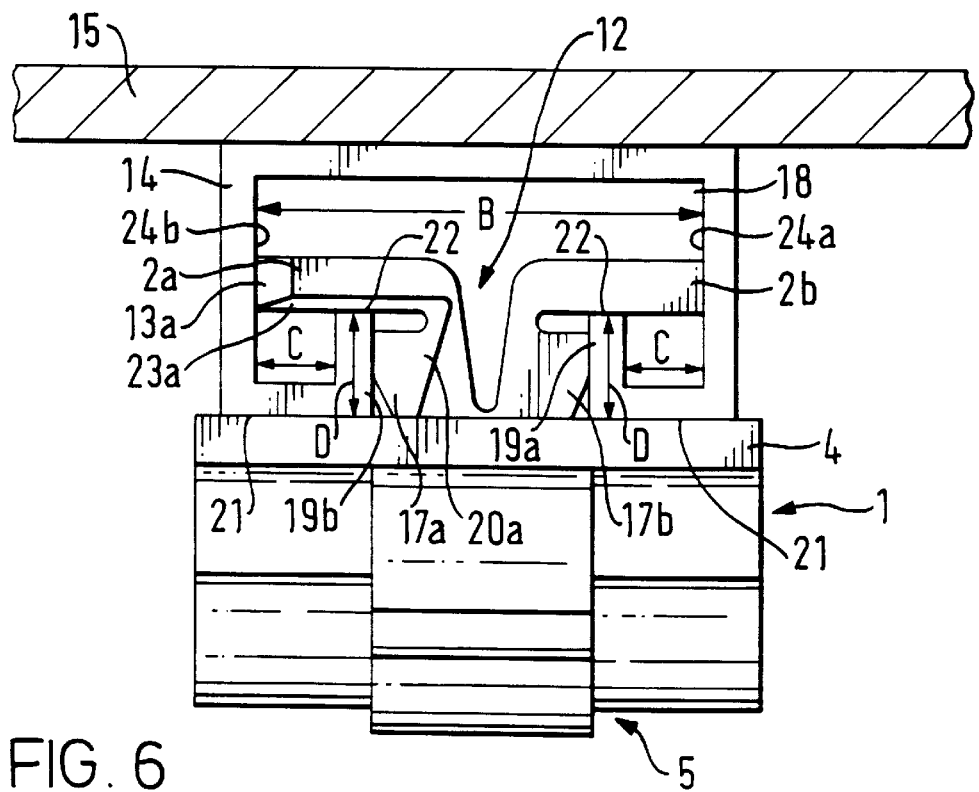
FIG. 6 is a side elevation view of the device of FIG. 1 shown installed on a track of narrower width.
Figure 7:
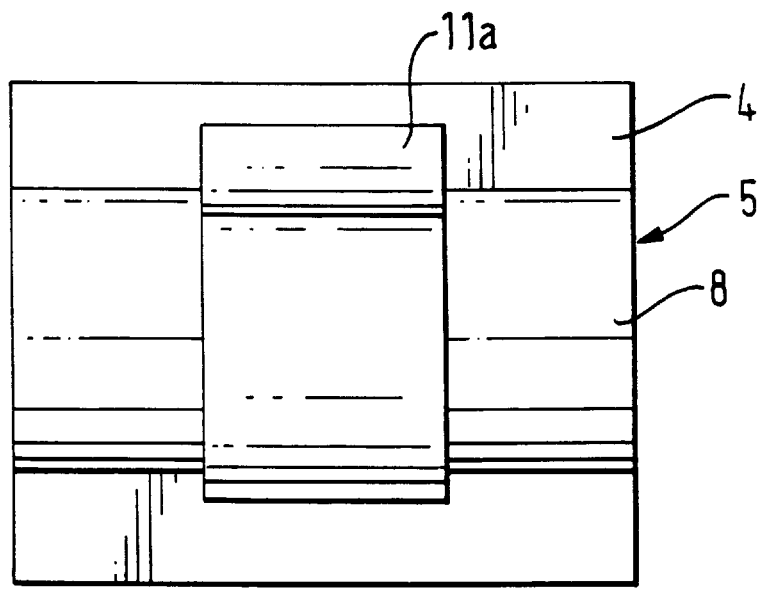
FIG. 7 is a plan view of the top of the device of FIG. 1.
Figure 8:
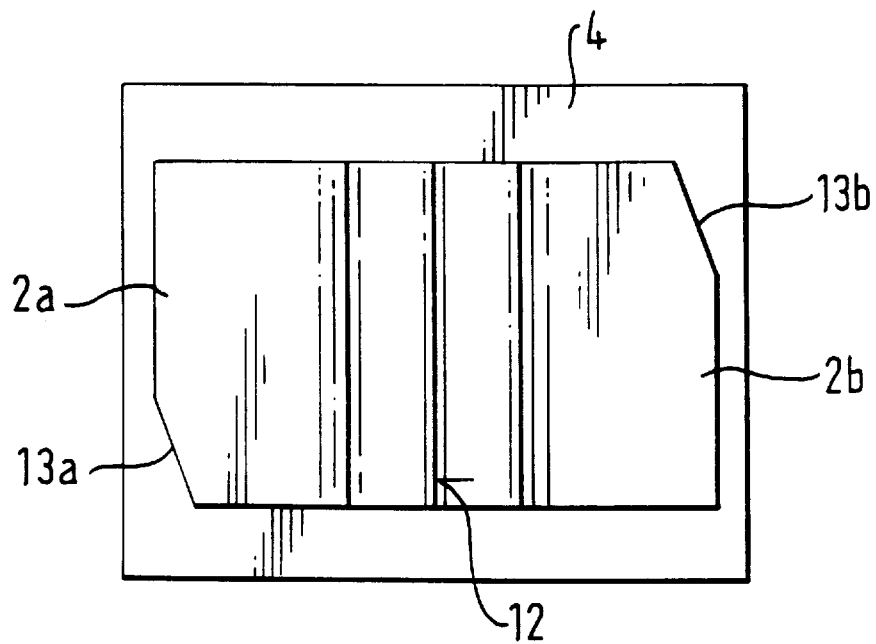
FIG. 8 is a plan view of the bottom of the device of FIG. 1.

In use, the width of the two-part foot 2a, 2b is such that it can be inserted in a first orthogonal orientation into a slot 18 of the track 14. The device 1 can then be engaged in the track 14 by rotating it bodily in the direction shown by the headed arrow A on FIG. 3 to a second orthogonal position in which the axis of the clip 5 corresponds to the axis of the elongate member 10 to be fitted thereto. The track 14 is provided with first engagement surfaces 21 and second engagement surfaces 22, in the first position of insertion, as shown in FIG. 3, the pedestal 4 of the device 1 co-operates with the first engagement surfaces 21. When the device 1 is rotated 90° to the second position of insertion, as shown in FIGS. 4 and 5, the pedestal 4 co-operates with the first engagement surfaces 21 and a surface of the two-part foot 2a, 2b mutually opposed to the pedestal 4, co-operates with the second engagement surfaces 22, to cammingly engage the first and second engagement surfaces 21 and 22. Each end of the two-part foot 2a, 2b is angled slightly towards the pedestal to assist in the camming action. Simultaneously with the rotation of the device 1, wedging surfaces 17a, 17b, positioned on either side of the shank-like portion 3 directed towards the two ends of the device 1, co-operate with flanges 19a, 17b of the track 14, and the ends of the two-part foot 2a, 2b co-operate against respective side walls 24a, 24b of the track 14, to wedge the device 1 into the track 14.

Referring to FIGS. 3 and 5, the wedging surfaces 17a, 17b are provided with a pair of diagonally opposed corners 20a, 20b which in common with the corners 13a, 13b of the foot 2a, 2b are rounded to facilitate rotation of the device 1 for insertion into the track.

The two-part foot 2a, 2b is provided with diagonally opposed inclined faces 23a, 23b, from which faces rise the corners 13a, 13b to meet with the shank-like portion 3.

Once securely fastened to the track 14 the clip 5, may be opened by (if necessary) squeezing the body 6 to release the inter-engaging formations 11a, 11b and raise the portion 8 using the hinge 7. A portion of the elongate member 10 can then be inserted into the slot 9 and secured in position by re-engaging the portion 8 of the body 6.

Further diameters of cylindrical body 6 or engaging portions 11a, 11b may be provided to accommodate different sizes of elongate members to be supported.

In a variant, shown in FIG. 5, the device 1 is secured to a track 14 of narrower overall dimensions (B, C) due to the v- or u-shaped profile 12 of the shank-like portion 3 enabling the two-parts of the two-part foot 2a, 2b to move towards each other. The movement of the two parts of foot 2a, 2b towards each other also increases the wedging pressure at all co-operating surfaces of the track 14, (19a, 17b, 21, 22, 24a, 24b).

The inclined faces 23a, 23b facilitate rotation of the device 1 during insertion, and, in particular, enable the device 1 to be inserted in a track 14 of variable depth (D) of the flanges 19a, 19b.

It will be obvious to one skilled in the art that the invention is not limited to the above embodiment and in particular that the invention may be used not only with pipe but also any elongate member, for example, conduit, electrical cabling and the like, and that the cross-sectional shape of the clip may be varied accordingly. Furthermore the device may be handed to allow clockwise or anti-clockwise insertion by rounding respective diagonally opposite corners.

I claim:

1. A support device useful for securing an elongate member to a length of channel-section track, such track being secured in use to a supporting structure, the support device comprising mutually-opposed surfaces, a clip which provides a means for retaining the elongate member, and a track-engagement portion connected to said clip which is insertable in the track and is rotatable to cammingly engage with first and second engagement surfaces of said track, at least one said mutually-opposed surfaces having an inclined face to facilitate engagement with said first and second engagement surfaces of the track, and wherein the track-engagement portion comprises a shank-like portion which provides a two-part foot to permit engagement with tracks of various sizes.

2. A support device as claimed in claim 1, wherein the shank-like portion is provided with a u-shaped profile.

3. A support device as claimed in claims 1, wherein the shank-like portion and two-part foot are formed of a resilient plastics material which provides further flexibility.

4. A support device as claimed in claim 1 wherein the two-part foot is provided with at least one rounded corner to facilitate rotation.

5. A support device as claimed in claim 1, wherein the retaining means is formed integrally with the clip.

6. A support device as claimed in claim 1, the device is of unitary construction.

7. A support device as claimed in claim 1, wherein the shank-like portion is provided with a v-shaped profile.

8. A support device as claimed in claim 1 in combinnation with the elongate member is a pipe.

9. A support device as claimed in claim 1 in combination with the elongate member is a cable.

10. A support device as claimed in claim 1, wherein the clip and the track-engaged portion are inseparable parts of a single unitary structure.

11. A support device as claimed in 1, wherein the clip and a pedestal are inseparabele parts of a single unitarty structure to which the track-engaged portion is secured.

12. A support device as claimed in claim 1, wherein the shank-like portion depends from a pedestal and comprises two separate and divergent limbs whose free ends extend away from each other in a plane substantially parallel to said pedestal to form the two-part foot.

13. A support device useful for securing an elongate member to a length of channel-section track, such track being secured in use to a supporting structure, the support device comprising mutually-opposed surfaces, a clip which provides a means for retaining the elongate member, and a track-engagement portion connected to said clip which is insertable in the track and is rotatable to cammingly engage with first and second engagement surfaces of said track, wherein the track-engagement portion comprises a shank-like portion which depends from a pedestal and comprises two separate and divergent limbs whose free ends extend away from each other in a plane substantially parallel to said pedestal to form a two-part foot to permit engagement with tracks of various sizes, and wherein each of the limbs has a raised wedging surface extending substantially parallel to and intermediate said pedestal and the two-part foot so that, in use, the raised wedging surface impinges on a flange connecting said first and second engagement surfaces of said track.

14. A support device as claimed in claim 13, wherein free ends forming the two-part foot are angled slightly towards the pedestal.

15. A support device as claimed in claim 14, wherein the raised wedging surfaces are provided with a rounded corner to facilitate engagement with the channel-section track.

16. A support device as claimed in claim 13, wherein the shank-like portion is provided with a u-shaped profile.

17. A support device as claimed in claim 13, wherein the shank-like portion and two-part foot are formed of a resilient plastics material which provides further flexibility.

18. A support device as claimed in claim 13, wherein the two-part foot is provided with at least one rounded corner to facilitate rotation.

19. A support device as claimed in claim 13, wherein the retaining means is formed integrally with the clip.

20. A support device as claimed in claim 13, wherein the device is of unitary construction.

21. A support device as claimed in claim 13, wherein the shank-like portion is provided with a v-shaped profile.

22. A support device as claimed in claim 13, wherein the clip and the track-engagement portion are inseparable parts of a single unitary structure.

23. A support device as claimed in claim 13, wherein the clip and a pedestal are inseparable parts of a single unitary structure to which the track-engagement portion is secured.

24. A support device as claimed in claim 13, wherein the shank-like portion depends from a pedestal and comprises two separate and divergent limbs whose free ends extend away from each other in a plane substantially parallel to said pedestal to form the two-part foot.

* * * * *